DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 981

T890,010

STABILIZATION OF POLYPHOSPHATE FERTILIZER SOLUTIONS BY FLUORIDES OR FLUOSILICATES

Alva W. Frazier, 2219 Randolph St., Florence, Ala. 35630

Continuation-in-part of application Ser. No. 30,264, Apr. 20, 1970. This application Oct. 21, 1970, Ser. No. 82,809

Int. Cl. C05b *7/00, 13/06*

U.S. Cl. 71—34

No Drawing. 22 Pages Specification

Wet-process phosphoric acids contain metallic impurities—mostly magnesium, aluminum, and iron—dissolved in the acidulation of the parent phosphate rock. Ammonium polyphosphate fertilizer solutions prepared therefrom deposit sludges of phosphates of the metallic impurities that interfere seriously with mechanical handling of the liquids. Formation of the sludges can be prevented, however, by addition of fluorine as either fluoride or fluosilicate.

A minor excess of fluoride over that required to form the most common sludge phase, water-insoluble salt $$MgAl(NH_4)_5(P_2O_7)_2F_2 \cdot 6H_2O$$

in ammonium and potassium polyphosphate liquid fertilizer solutions prevents the precipitation of these metallic impurities. The precipitation of less common solid phases such as $Mg(NH_4)_2P_2O_7 \cdot 4H_2O$, $$Al(NH_4)_2P_2O_7OH \cdot 3H_2O$$

and $$Mg(NH_4)_6(P_2O_7)_2 \cdot 6H_2O$$

is prevented when the fluoride concentration is increased to give a sequestration ratio (S.R.) of about 0.5 at a 50% polyphosphate content or 0.14 at a polyphosphate value of 10% of the total $P_2O_5$, said sequestration ratio being determined by the empirical equation:

$$\text{S.R.} = \frac{\text{Wt. percent F}}{\text{Wt. percent MgO} + 3 \text{ wt. percent } Al_2O_3 + 0.33 \text{ wt. percent } Fe_2O_3}$$

Effectively, this increase in fluoride content shifts the solution composition from a region of stability for these insoluble salts to a region where water-soluble compounds, such as dimorph II of $MgAl(NH_4)_5(P_2O_7)_2F_2 \cdot 6H_2O$, are the stable phases, thus sequestering the metallic cations.